United States Patent Office 3,396,557
Patented Aug. 13, 1968

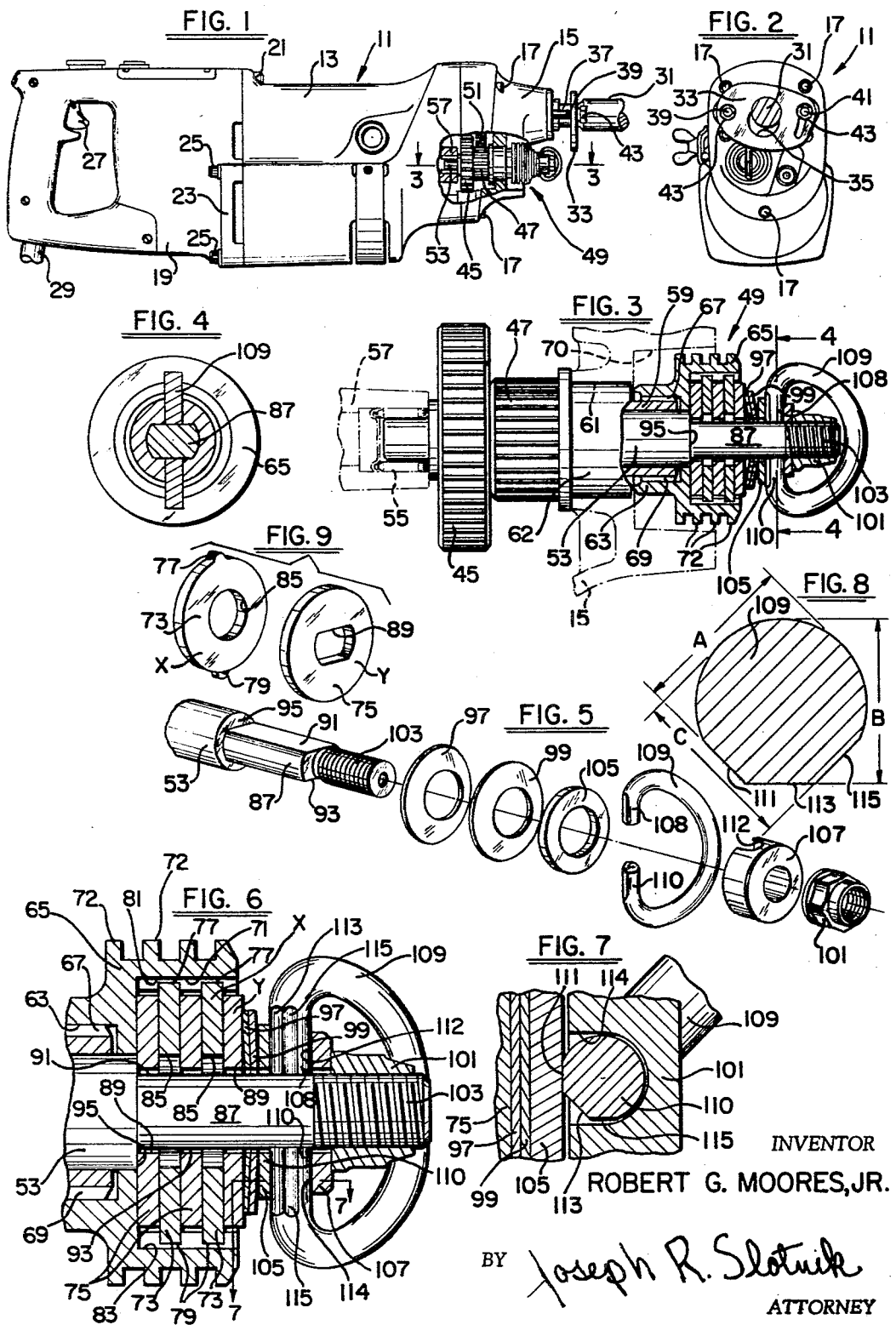

3,396,557
ADJUSTABLE SLIP CLUTCH FOR
ROTARY TOOLS
Robert G. Moores, Jr., Cockeysville, Md., assignor to The
Black and Decker Manufacturing Company, Towson,
Md., a corporation of Maryland
Filed Aug. 19, 1966, Ser. No. 573,554
12 Claims. (Cl. 64—30)

ABSTRACT OF THE DISCLOSURE

The device disclosed herein is a power operated tool including a rotary input and a rotary output interconnected by a transmission. The output is adapted to have a tool bit (e.g. a drill bit) interconnected therewith while the transmission includes a friction type clutch device adapted to slip when a predetermined resistance torque load is imposed on the tool bit. In addition, means is provided to afford a quick adjustment of the torque level at which the clutch will slip.

---

This invention relates generally to power tools and particularly to an improved slip clutch for power operated rotary tools.

An important object of the present invention is to provide an improved slip clutch for use with power operated rotary tools which is adapted to slip when a predetermined level of reaction torque is developed on the tool bit but which is adapted for selective quick adjustment to raise the torque level at which the aforementioned slippage occurs.

Additional important objects of the present invention are to provide a slip clutch construction of the above character which does not require tool disassembly to effect adjustment and which is adapted for rapid heat dissipation during use.

Further objects include the provision of a slip clutch of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a side elevational view of a rotary hammer embodying the present invention;

FIGURE 2 is an end view of FIGURE 1;

FIGURE 3 is an enlarged sectional view of FIGURE 1 taken along the line 3—3 thereof;

FIGURE 4 is a sectional view of FIGURE 3 taken along the line 4—4 thereof;

FIGURE 5 is an exploded perspective view of a portion of the clutch adjusting mechanism constructed according to the present invention;

FIGURE 6 is an enlarged view similar to FIGURE 3 showing the clutch parts in an adjusted position;

FIGURE 7 is an enlarged sectional view of FIGURE 6 taken along the line 7—7 thereof;

FIGURE 8 is a sectional view of the clutch actuating cam of the present invention; and FIGURE 9 is an exploded perspective view illustrating the clutch plates used with the present invention.

Broadly described, the present invention includes, in a power operated rotary tool, a housing, a rotary input means within said housing, a rotary output means within said housing and adapted to be drivingly connected to a rotatable tool bit, a clutch having first and and second operatively frictionally engaged portions rotatable with said input and output means, respectively, resilient means biasing said first and second portions into operative frictional engagement, manually operable means outside said housing for adjusting the force imposed by said resilient means and detent means for releasably holding said manually operable means in selected adjusted positions, said detent means including distinct spaced surface portions on said manually operable means cooperating with said resilient means for positively holding said manually operable means in said adjusted positions.

Referring now more specifically to the drawings, one type of power tool in which the present invention finds use is a rotary hammer illustrated generally at 11 in FIGURES 1 and 2. The rotary hammer 11 is seen to include a case housing 13 having an end housing 15 secured thereto by screws 17. An end handle and gear case 19 is fixed to the case housing 13 by screws 21 and is formed with lateral flanges 23 (only one of which is shown) also fixed to the case housing 13 by screws 25. The handle and gear case 19 has a trigger switch 27 and a conventional line cord 29, and the handle 19 together with the housings 13, 17 may be constructed from a die cast aluminum alloy or may be molded using a suitable glass fiber material as is customary in the art.

The rotary hammer 11 is provided with a conventional electric motor (not shown) or other power source which may be positioned within the lower portion of the case housing 13 and which is adapted to impart longitudinal reciprocating as well as rotating movement to a tool bit 31. To reciprocate the tool bit 31, the electric motor (not shown) may have field windings and a rotating armature connected to a piston and floating ram by a gear and crank transmission so that the ram is reciprocated and hammers on the tool bit. One such construction is illustrated and described in detail in U.S. Patent No. 3,203,-490, granted Aug. 31, 1965, to G. W. McCarty et al. and owned by the assignee of the present application, and for a better understanding thereof, reference may be made thereto.

A tool retainer plate 33 is provided with a central aperture 35 slidably and rotatably receiving a reduced diameter portion 37 of the tool bit 31 and is carried upon the end housing 17 by a pair of resiliently mounted piston-like rods 39, 41. The rods 39, 41 are fixed at one end to the plate 33 by nuts 43 threaded on these ends of the rods and the plate 33 functions to prevent the tool bit 31 from pulling out of the end housing 17 and cushions reciprocating movement thereof. For a detailed description of the retainer plate 33 and its resilient mounting, reference may be made to applicant's copending application Ser. No. 579,260, filed Sept. 14, 1966, and owned by the assignee of the present application.

As described above, the tool bit 31 is adapted for rotation about its longitudinal axis as well as reciprocation therealong. To this end, the electric motor armature (not shown) has an armature shaft (not shown) drivingly interconnected to a gear 45 through a transmission (not shown). This transmission may be a straight gear reduction type or, if multiple, rotational speeds of the tool bit 31 are desired, the transmission may be of the type illustrated and described in applicant's copending application Ser. No. 569,332, filed Aug. 1, 1966, and owned by the assignee of the present application. In any event, the gear 45 is adapted for rotation upon energization of the electric drive motor (not shown) and is drivingly connected to a pinion 47 through a novel slip clutch device generally indicated at 49. The pinion 47 in turn imparts rotational movement to the tool bit 31 by drivingly engaging another gear 51 which is keyed for rotation with the tool bit 31. Preferably, but not necessarily, the gear 51 may have a central hexagonal socket opening slidingly receiving a complementary shaped shank on the tool bit as illustrated and described in the McCarty et al. patent referred to above.

As shown in FIGURES 3 and 6, the slip clutch device 49 is carried by a stepped diameter clutch shaft 53 which is keyed to or integral with the gear 45. The clutch shaft 53 is rotatably supported at one end by a needle bearing 55 positioned in a boss 57 formed in the case housing 13. The pinion 47 is rotatably mounted on the clutch shaft and has a cylindrical extension 59 which projects through an opening 61 in the end housing 15. A needle bearing 62 is seated in the housing opening 61 and rotatably supports the cylindrical extension 59 which, in turn, rotatably supports the adjacent portion of the clutch shaft 53.

The outer end of the cylindrical extension 59 is received in a bore 63 in a clutch sleeve or housing 65 and is keyed thereto at 67, 69 for rotation conjointly therewith. The clutch housing 65 is set in a cavity 70 exteriorly of the end housing 15 and has a plurality of radial fins 72 for rapid heat dissipation. The clutch housing 65 also has a forwardly facing, generally cylindrical bore 71 in which is disposed a plurality of alternately arranged, confronting clutch discs or plates 73, 75. The clutch plates 73 are provided with at least one and preferably a pair of diametrically spaced, radially outwardly projecting ears 77, 79 which are received in axially extending grooves 81, 83 in the clutch housing bore 71. Each of the clutch plates 73 has a cylindrical opening 85 loosely fitted on a reduced diameter clutch shaft portion 87 so that the clutch plates 73 can turn relative to the clutch shaft 53. Engagement between the ears 77, 79 and the clutch housing grooves 81, 83, however, causes the plates 73 to rotate conjointly with the clutch housing 65.

The clutch plates 75 are alternately arranged relative to the clutch plates 73, as described, and are generally cylindrical in configuration having a flattened center opening 89. The shaft portion 87 is formed with flats 91, 93 so that its cross-sectional configuration generally complements the cross-sectional configuration of the disc center openings 89. These clutch plates 75 therefore rotate conjointly with the clutch shaft 53 but are free to turn relative to the clutch housing 65.

The clutch plates 73, 75 are pressed together and against a shoulder 95 on the clutch shaft 53 under the force of Belleville washers 97, 99 which are held in place on the reduced diameter shaft portion 87 by a nut 101 threaded on the forward or outer end 103 of the shaft reduced portion 87. A washer 105 is positioned on the shaft reduced portion behind the Belleville washers 97, 99. A clutch cam 109, which may be formed from a generally C-shaped bent wire-loop, is positioned behind the washers 105 and is held in place by a cam guide 107 interposed between tangs 108, 110 of the cam 109 and the nut 101. The cam guide is slotted at 112, 114 to receive the tangs 108, 110, respectively, and allows the cam 109 to pivot relative to the shaft portion 87.

As set forth above, the gear 45 is driven by the electric motor (not shown) and is fixed to or integral with the clutch shaft 53. The pinion 47 is keyed to the clutch housing 65 and, when rotated, rotates the tool bit 31 through the gear 51. The pinion 47 is rotatable on the clutch shaft 53 but is adapted to turn with the clutch shaft 53 through frictional engagement between the clutch plates 73, 75 which rotate with the clutch housing 65 and clutch shaft 53, respectively. The clutch plates 73, 75 are pressed together under a resilient force imposed by the Belleville washers 97, 99 which force is adjustable by selective adjustment of the nut 101 and/or pivotal movement of the clutch cam 109 in a manner to be described.

During use of the tool 11, working engagement between the tool bit 31 and the material being worked develops a resistance force on the tool drive mechanism. This resistance force opposes the drive force developed by the tool power source and these two forces are reacted at the clutch device 49. At some predetermined level of resistance force, i.e., when the resistance force and drive force combined exceed the frictional force between the clutch plates 73, 75, these plates will slip relative to each other and rotational movement of the tool bit 31 stops. This feature is desirable particularly in high powered rotary and rotary impact tools since if no slip clutch were provided, the reaction force could unexpectedly jar the tool operator and possibly injure him and/or damage the tool drive components.

Manifestly, the initial reaction force level at which the clutch plates 73, 75 slip relative to each other is selected so as not to exceed a level where the operator and/or the tool drive components would be injured. However, once the operator is made aware of the fact that a high resistance force situation exists, e.g. that the tool bit 31 is "grabbing," he can brace himself against it. Thus, it is desirable that provision be made to adjust the frictional force between the clutch plates 73, 75 so that the resistance force level at which these plates will slip can be raised.

According to the present invention, this friction force adjustment is accomplished simply and rapidly by the operator and without dismantling any of the tool parts. Thus, as seen in FIGURES 7 and 8, the clutch cam tangs 108, 110 are each formed with a plurality of arcuately spaced flats 111, 113, 115 which are adapted selectively to seat against the washer 105. These flats 111, 113, 115 are formed so that the distance of each from the diametrically opposite edge of the wire loop 109 differs from the other. Thus, the distance from the flats 111 and 115 to the diametrical opposite edge of the wire loop 109, illustrated by the dimensions A and C in FIGURE 8, is greater than the distance from the flats 113 to the diametrical opposite edge of the loop 109, illustrated by the dimension B in the figure. This can be accomplished simply by grinding and forming flats 111 and 115 of a lesser width than the flats 113.

With the parts in position as shown in FIGURE 3, the clutch cam 109 is positioned with the flats 113 seated against the washer 105. In this position, the frictional force between the clutch plates 73, 75 is least and these plates will slip at a relatively low level of resistance force. When the clutch cam 109 is pivoted to the position shown in FIGURES 6 and 7, the flats 111 seat against the washer 105. Owing to the fact that the dimension A is greater than the dimension B, the Belleville washers 97, 99 are pressed more tightly against the clutch plates 73, 75 and the frictional force between the plates is raised. This then raises the level of resistance force at which the clutch plates 73, 75 will slip relative to each other. Likewise when the clutch cam 109 is pivoted to seat the flats 115 against the washer 109, the resistance force level at which the clutch plates 73, 75 slip is raised in a like manner. In all positions, the cam 109 is positively held against inadvertent pivotal movement by the detent-like cooperation between the surfaces 111, 113, 115 and the spring biased washer 105.

Initially, the clutch cam 109 is positioned as shown in FIGURE 3 and the tool 11 is used until the clutch plates 73, 75 slip as a result of a developed resistance force. At this time, the operator is made aware of the situation and can then flip the clutch cam 109 to the position shown in FIGURES 6 and 7 where the flats 111 seat against the washer 105 or, he can flip the cam 109 in the opposite direction to seat the flats 115 against the washer 105. In either "flipped" position of the clutch cam 109, the biasing force of the Belleville washers 97, 99 on the plates 73, 75 is increased over the initial level. The operator can then brace himself and can continue working. After the "grabbing" condition of the tool bit in the work ceases, the operator can return the clutch cam 109 to the center position (shown in FIGURE 3) since greater protection is afforded him with the parts in this position. Thus, by this construction, there is provided a highly simple but very effective operator controlled, friction clutch adjustment.

Another feature of this invention resides in the fact that the two levels of friction clutch adjustment can be varied, if desired. Thus, by threading the nut 101 up or back on the clutch shaft end 103, the axial position of the clutch cam 109 relative to the clutch plates 73, 75 is adjusted so that the operator can accurately select the resistance force levels at which the plates 73, 75 will slip according to his desires.

By the foregoing there has been disclosed an improved slip clutch device calculated to fulfill the inventive objects set forth hereinabove, and while a preferred embodiment of the present invention has been illustrated and described above in detail, various additions, substitutions, modifications and omissions may be made thereto without departing from the spirit of the invention as encompassed by the appended claims.

I claim:

1. In a power operated rotary tool, a housing, a rotary input means within said housing, a rotary output means within said housing and adapted to be drivingly connected to a rotatable tool bit, a clutch having first and second operatively frictionally engaged portions rotatable with said input and output means, respectively, resilient means biasing said first and second portions into operative frictional engagement, manually operable means outside said housing for adjusting the force imposed by said resilient means and detent means for releasably holding said manually operable means in selected adjusted positions, said detent means including distinct spaced surface portions on said manually operable means cooperating with said resilient means for positively holding said manually operable means in said adjusted positions.

2. A device as defined in claim 1 wherein said clutch portions are rotatable about a first axis, said manually operable means including cam means turnable about a second axis generally perpendicular to said first axis.

3. A device as defined in claim 1 which includes means for bodily shifting the position of said manually operable means relative to said operatively frictionally engaged clutch portions to shift the range of adjustment provided by said manually operable means.

4. A device as defined in claim 1 wherein said first clutch portion includes shaft means interconnected with said input means, said second clutch portion including sleeve means rotatable on said shaft means, first and second operatively engageable friction means rotatable with said shaft means and said sleeve means, respectively, said resilient means biasing said friction means in one direction causing operative frictional engagement therebetween, said manually operable means operatively engaging said resilient means and adapted to vary the biasing force imposed on said friction means.

5. A device as defined in claim 4 wherein said manually operable means is carried by said shaft means.

6. A device as defined in claim 4 wherein said resilient means includes Belleville washer means on said shaft means, said manually operable means including cam means turnable about a second axis generally perpendicular to the axis of said shaft means and operatively engaging said Belleville washer means.

7. A device as defined in claim 4 wherein said manually operable means includes cam means pivotally mounted relative to said shaft means for movement about an axis generally perpendicular to said shaft means, said pivotally mounted means having spaced distinct cam surfaces operatively engaging said resilient means whereby pivotal movement of said pivotally mounted means from a first position increases the operative frictional engagement between said friction means.

8. A device as defined in claim 7 which includes means carried by said shaft means outwardly of said housing and adapted to manually shift the position of said cam means axially on said shaft means relatively to said operatively engaged friction means, whereby to shift the range of adjustment provided by said cam means.

9. A device as defined in claim 4 wherein said friction means includes alternately arranged first and second disc means keyed to said shaft means and said sleeve means, respectively.

10. In a power operated rotary tool, a housing, a rotary input means within said housing, a rotary output means within said housing and adapted to be drivingly connected to a rotatable tool bit, a clutch including shaft means interconnected with said input means, sleeve means rotatable on said shaft means and first and second operatively engageable friction means rotatable with said shaft means and said sleeve means, respectively, resilient means biasing said first and second friction means into operative friction engagement, manually operable means including cam means pivotally mounted relative to said shaft means, said cam means having at least two arcuately spaced flat surfaces spaced different distances from their respective opposite edge of said cam means and adapted to operatively engage said resilient means, whereby pivotal movement of said cam means from a first position increases the operative frictional engagement between said friction means.

11. In a power operated rotary tool, a housing, a rotary input means within said housing, a rotary output means within said housing and adapted to be drivingly connected to a rotatable tool bit, a clutch including shaft means interconnected with said input means, sleeve means rotatable on said shaft means and first and second operatively engageable friction means rotatable with said shaft means and said sleeve means, respectively, resilient means biasing said first and second friction means into operative friction engagement, manually operable means including cam means pivotally mounted relative to said shaft means, said cam means having three arcuately spaced flat surfaces, two of which are spaced a greater distance from their respective opposite edge of said cam means than the other flat surface, said flat surfaces being adapted to operatively engage said resilient means, whereby pivotal movement of said cam means from one position, where said other flat surface operatively engages said resilient means, to another position, where one of said two flat surfaces, operatively engages said resilient means, increases the operative frictional engagement between said friction means.

12. A device as defined in claim 11 wherein a first one of said flat surfaces is spaced a first predetermined distance from the opposite edge of said pivotally mounted means, a second and third one of said flat surfaces are arcuately spaced from said first flat surface and are on opposite sides thereof and spaced from the opposite edge of said pivotally mounted means a second predetermined distance greater than said first predetermined distance.

References Cited
UNITED STATES PATENTS

| | | | |
|---|---|---|---|
| 1,185,278 | 5/1916 | Ball | 192—93 X |
| 1,745,131 | 1/1930 | Vallen | 64—30 |
| 2,606,431 | 8/1952 | Elgin | 64—30 |
| 2,646,939 | 7/1953 | Hirsch | 64—30 X |
| 2,727,610 | 12/1955 | Frerer et al. | 64—30 X |
| 3,083,658 | 4/1963 | Winberg | 64—30 X |
| 3,208,316 | 9/1965 | Scribner | 64—30 X |

HALL C. COE, *Primary Examiner.*